(12) United States Patent
Chen et al.

(10) Patent No.: US 12,547,222 B2
(45) Date of Patent: Feb. 10, 2026

(54) ELECTRONIC DEVICE

(71) Applicant: Acer Incorporated, New Taipei (TW)

(72) Inventors: Hung-Chi Chen, New Taipei (TW);
Cheng-Han Lin, New Taipei (TW);
Huei-Ting Chuang, New Taipei (TW);
Shun-Bin Chen, New Taipei (TW);
Yen-Chieh Chiu, New Taipei (TW)

(73) Assignee: Acer Incorporated, New Taipei (TW)

( * ) Notice: Subject to any disclaimer, the term of this patent is extended or adjusted under 35 U.S.C. 154(b) by 106 days.

(21) Appl. No.: 18/677,898

(22) Filed: May 30, 2024

(65) Prior Publication Data

US 2025/0208670 A1 Jun. 26, 2025

(30) Foreign Application Priority Data

Dec. 26, 2023 (TW) .................................. 112150825

(51) Int. Cl.
*G06F 1/16* (2006.01)
*G06F 3/0354* (2013.01)

(52) U.S. Cl.
CPC .......... *G06F 1/169* (2013.01); *G06F 3/03547* (2013.01)

(58) Field of Classification Search
CPC .... G06F 1/169; G06F 1/1616; G06F 3/04883; G06F 3/0488; G06F 3/03547
See application file for complete search history.

(56) References Cited

U.S. PATENT DOCUMENTS

2020/0064889 A1\* 2/2020 Liang .................... G06F 1/1662

\* cited by examiner

*Primary Examiner* — Allen L Parker
*Assistant Examiner* — Dakota M Talbert
(74) *Attorney, Agent, or Firm* — JCIPRNET

(57) ABSTRACT

An electronic device including a first body, a keyboard, a light-emitting touch pad module, a light-transmitting cover and a second body is provided. The first body has a first area and a second area arranged side by side. The keyboard is disposed in the first area. The light-emitting touch pad module is slidably disposed in the second area. The light-transmitting cover is disposed on the second area and covers the light-emitting touch pad module. The light-emitting touch pad module displays a drifting touch area on the light-transmitting cover. The second body is pivotally connected to the first body.

10 Claims, 6 Drawing Sheets

ELECTRONIC DEVICE

CROSS-REFERENCE TO RELATED APPLICATION

This application claims the priority benefit of Taiwan application serial no. 112150825, filed on Dec. 26, 2023. The entirety of each of the above-mentioned patent applications is hereby incorporated by reference herein and made a part of this specification.

BACKGROUND

Technical Field

The disclosure relates to an electronic device, and in particular to an electronic device with a drifting touch panel module.

Description of Related Art

Common notebook computers are equipped with physical input devices or physical operating devices such as keyboards and touch pad modules on the body. However, the position of the touch pad module on the body is fixed, which not only cannot meet the operating needs of users with different dominant hands, but also lacks operational flexibility.

SUMMARY

The present disclosure provides an electronic device with excellent operating flexibility.

An embodiment of the present invention provides an electronic device including a first body, a keyboard, a touch pad module, a light-transmitting cover and a second body. The first body has a first area and a second area arranged side by side. The keyboard is disposed in the first area. The touch pad module is slidably disposed in the second area and includes a touch panel and at least one light-emitting member disposed around the touch panel. The light-transmitting cover is disposed on the second area and covers the touch pad module. The second body is pivotally connected to the first body.

Another embodiment of the present invention provides an electronic device including a first body, a keyboard, a light-emitting touch pad module, a light-transmitting cover and a second body. The first body has a first area and a second area arranged side by side. The keyboard is disposed in the first area. The light-emitting touch pad module is slidably disposed in the second area. The light-transmitting cover is disposed on the second area and covers the light-emitting touch pad module. The light-emitting touch pad module displays a drifting touch area on the light-transmitting cover. The second body is pivotally connected to the first body.

Based on the above, in the electronic device of the present invention, users can instantly adjust the position of the touch pad module according to operational needs, so it has excellent operational flexibility.

In order to make the above-mentioned features and advantages of the application more obvious and easier to understand, the following embodiments are given and described in detail with the accompanying drawings as follows.

DESCRIPTION OF THE EMBODIMENTS

Figure 1A:
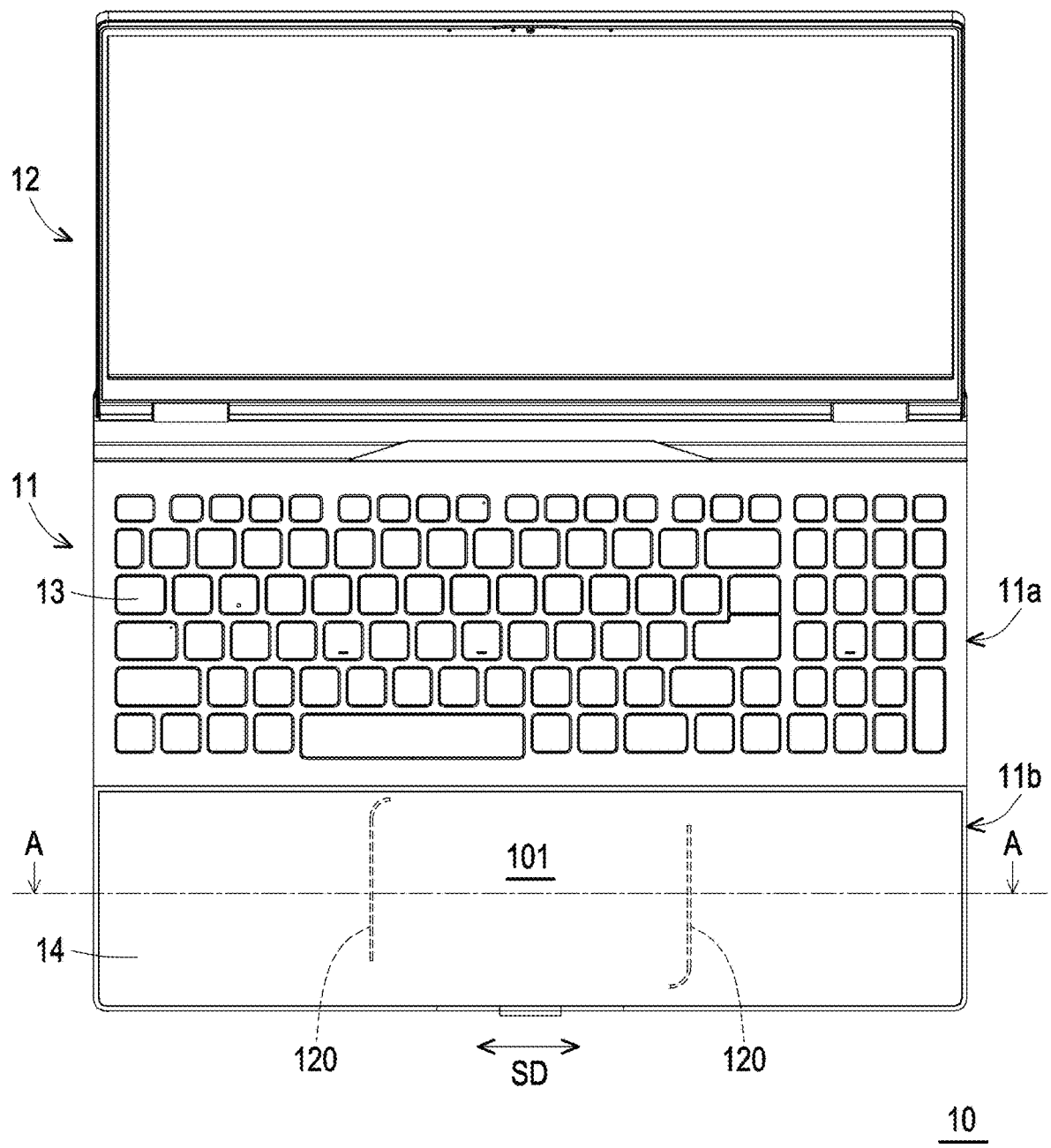
FIG. 1A and FIG. 1B are respectively top views of the electronic device in different operating modes according to an embodiment of the present invention.
Figure 1B:
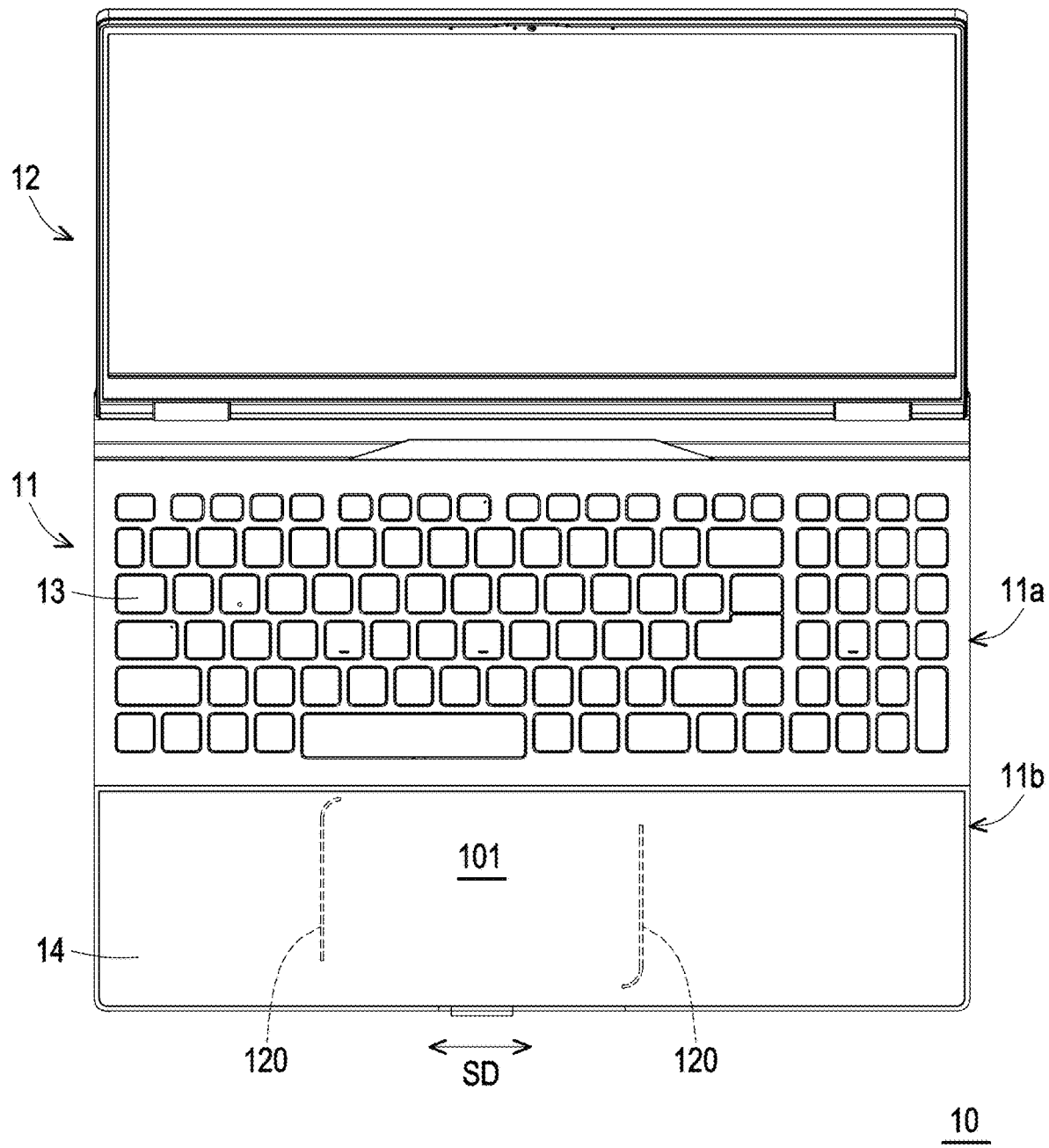
Figure 2A:
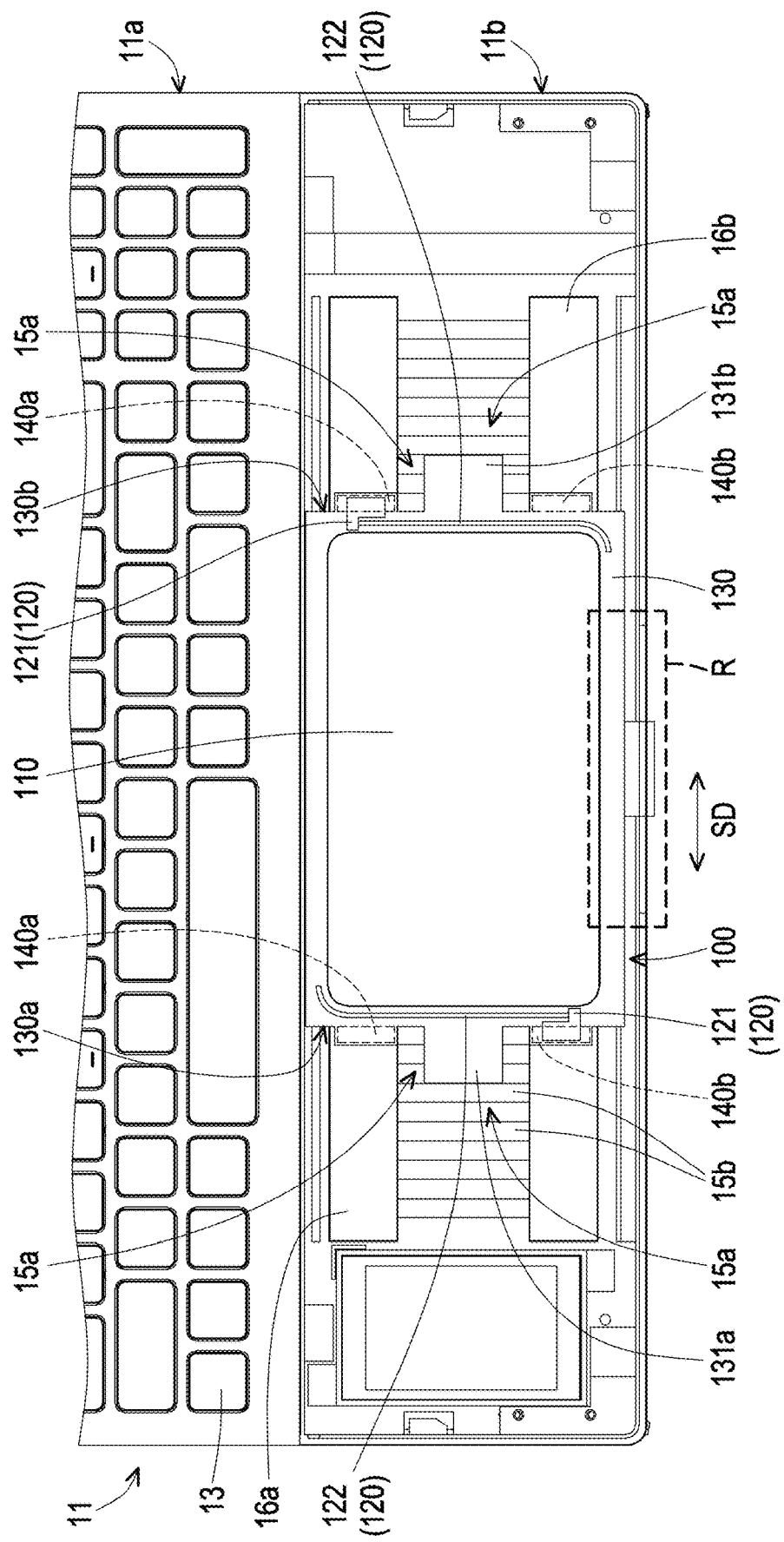
FIG. 2A is a partial schematic diagram of the internal structure of the first body of FIG. 1A.
Figure 2B:
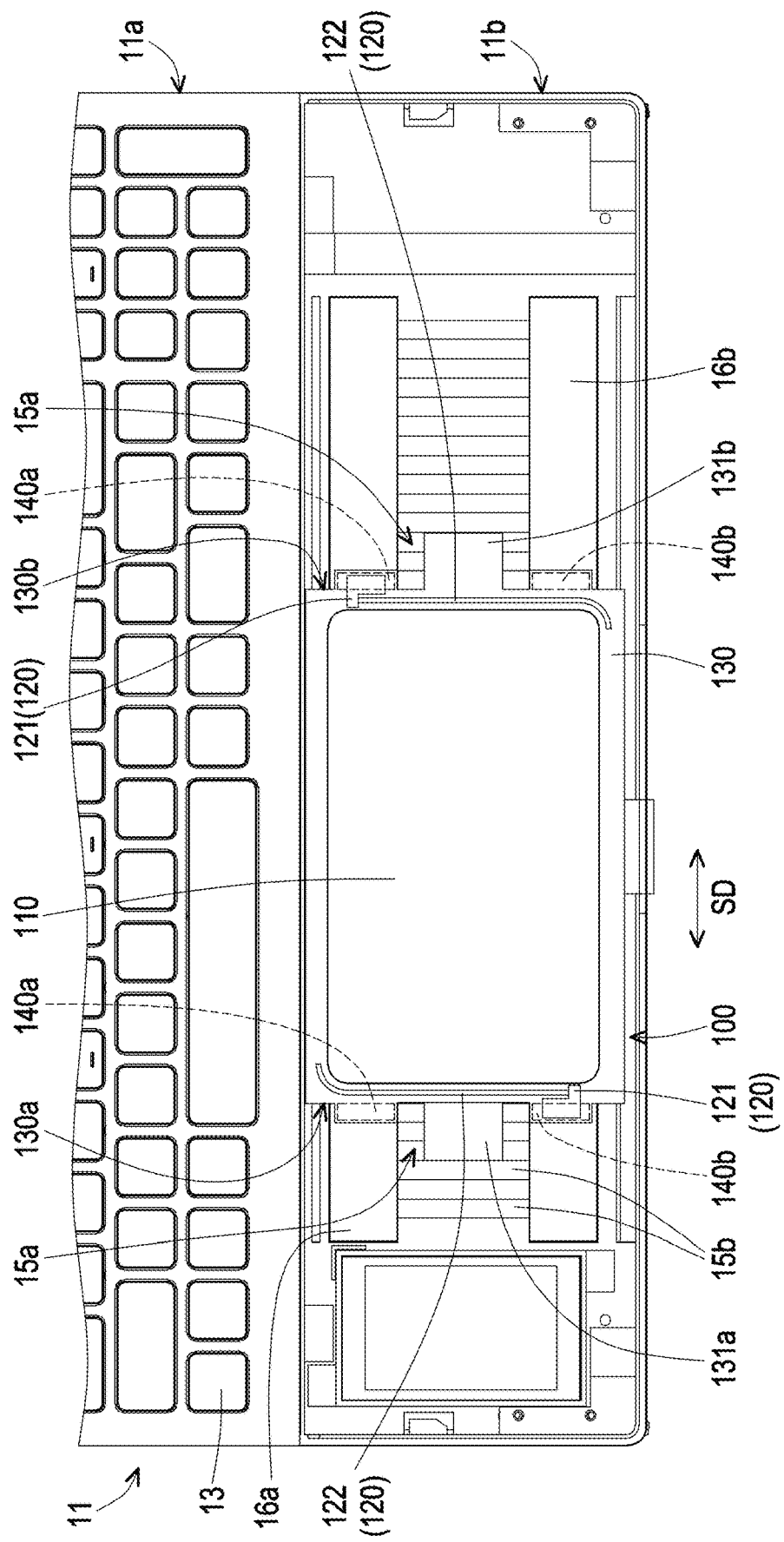
FIG. 2B is a partial schematic diagram of the internal structure of the first body of FIG. 1B.

FIG. 1A and FIG. 1B are respectively top views of an electronic device in different operating modes according to an embodiment of the present invention. FIG. 2A is a partial schematic diagram of the internal structure of the first body of FIG. 1A. FIG. 2B is a partial schematic diagram of the internal structure of the first body of FIG. 1B. In FIG. 2A and FIG. 2B, the light-transmitting cover 14 covering the touch pad module 100 is removed to reveal the structural configuration in a second area 11b. Referring to FIG. 1A to FIG. 2B, in the embodiment, the electronic device 10 can be a notebook computer and includes a first body 11, a second body 12, a keyboard 13, a light-transmitting cover 14 and a touch pad module 100. The first body 11 can be a host with logic computing capabilities, and the second body 12 can be a display pivotally connected to the first body 11.

In details, the first body 11 has a first area 11a and a second area 11b juxtaposed with the first area 11a, wherein the keyboard 13 is disposed in the first area 11a, and the touch pad module 100 is disposed in the second area 11b. The touch pad module 100 can be a light-emitting touch pad module and is covered by the light-transmitting cover 14 provided on the second area 11b. Therefore, the light emitted by the touch pad module 100 can penetrate the light-transmitting cover 14 and display or define a drifting touch area 101 on the light-transmitting cover 14. By displaying or defining the drifting touch area 101 on the light-transmitting cover 14, the user can quickly identify the position of the touch pad module 100 within the second area 11b. In addition, the user can intuitively perform sliding or touching operations within the drifting touch area 101 using fingers or other auxiliary tools.

As shown in FIG. 1A to FIG. 2B, the touch pad module 100 is floating on the first body 110 and is suitable for sliding back and forth in the second area 11b along a predetermined sliding direction SD, so that the user can adjust the position of the touch pad module 100 in real time to meet different operating needs. For users, the electronic device 10 has excellent operational flexibility.

In the embodiment, the touch pad module 100 includes a touch panel 110 and at least one light-emitting member 120 disposed around the touch panel 110, wherein the area of the light-transmitting cover 1 is larger than the area of the touch panel 110, and covers the touch panel 110. On the other hand, the light emitted by the light-emitting member 120 can penetrate the light-transmitting cover 14 and display or define the drifting touch area 101 surrounding the touch panel 110 on the light-transmitting cover 14. In this way, the user can quickly identify the position of the touch panel 110 in the second area 11b.

As shown in FIG. 1A and FIG. 2A or as shown in FIG. 1B and FIG. 2B, the number of the light-emitting member 120 may be two and are respectively arranged on opposite sides of the touch panel 110. In details, each light-emitting member 120 includes a light source 121 and a light guide 122 optically coupled to the light source 121, and the light guide 122 can be an optical fiber. On the other hand, the two light guides 122 of the two light-emitting members 120 respectively extend on opposite sides of the touch panel 110 to respectively receive light from the two light sources 121 and form two light strips on opposite sides of the touch panel 110.

In the embodiment, the touch pad module 100 further includes a carrier 130, wherein the touch panel 110 and the two light-emitting members 120 are disposed on the carrier 130, and the touch panel 110 is located between the two light-emitting members 120. In details, the carrier 130 has a first side 130a and a second side 130b opposite the first side 130a, and the sliding direction SD is perpendicular to the first side 130a and the second side 130b. On the other hand, the two light guides 122 of the two light-emitting members 120 extend respectively along the first side 130a and the second side 130b to respectively receive light from the two light sources 121 and form two light strips on opposite sides of the touch panel 110.

In other embodiments, the number of the light-emitting member 120 can be increased or decreased appropriately. Taking the configuration of one light-emitting member 120 as an example, the light guide 122 can extend on the carrier 130 along the periphery of the touch panel 110, for example, surrounding the touch panel 110 to form a semi-enclosed or fully enclosed annular light strip around the touch panel 110.

Figure 3:
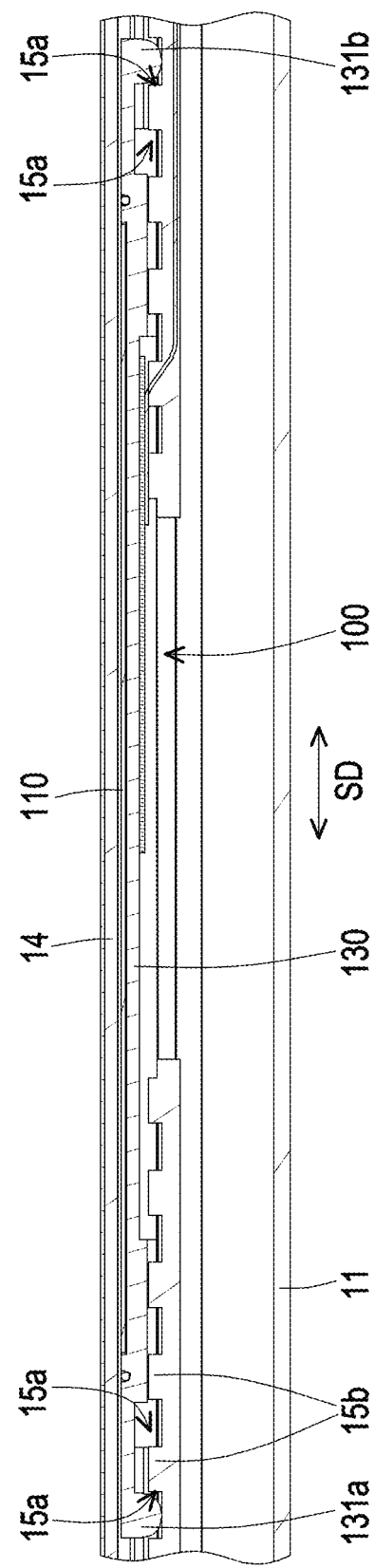
FIG. 3 is a partial cross-sectional schematic diagram of FIG. 1A along line segment A-A.

FIG. 3 is a partial cross-sectional schematic diagram of FIG. 1A along line segment A-A. Referring to FIG. 2A, FIG. 2B and FIG. 3, in the embodiment, the carrier 130 includes a first positioning hook 131a protruding from the first side 130a and a second positioning hook 131b protruding from the second side 130b, and the first positioning hook 131a and the second positioning hook 131b can be two elastic arm type hooks. On the other hand, the first body 11 is provided with multiple positioning slots 15a and multiple positioning ribs 15b arranged along the sliding direction SD in the second area 11b, and a positioning slot 15a is formed between any two adjacent positioning ribs 15b.

A portion of the positioning slots 15a is located on the movement path of the first positioning hook 131a. When the touch pad module 100 slides in the second area 11b along the sliding direction SD, the first positioning hook 131a is separated from the original engaged positioning slot 15a and is engaged in another positioning slot 15a to fix the position of the touch pad module 100 in the second area 11b. On the other hand, another part of the positioning slots 15a1 is located on the movement path of the second positioning hook 131b. When the touch pad module 100 slides in the second area 11b along the sliding direction SD, the second positioning hook 131b is separated from the original engaged positioning slot 15a and is engaged in another positioning slot 15a to fix the position of the touch pad module 100 in the second area 11b.

In other embodiments, the first positioning hook 131a and the second positioning hook 131b can be configured selectively.

Referring to FIG. 2A and FIG. 2B, in the embodiment, the touch pad module 100 further includes two first magnetic members 140a arranged in pairs and two second magnetic members 140b arranged in pairs. The two first magnetic members 140a and the two second magnetic members 140b are disposed on the carrier 130 and are respectively located on opposite sides of the first positioning hook 131a or the second positioning hook 131b. For example, the two first magnetic members 140a and the two second magnetic members 140b may be distributed at four corners of the carrier 130.

The connection between the two first magnetic members 140a is parallel to the connection between the two second magnetic members 140b and parallel to the connection between the first positioning hook 131a and the second positioning hook 131b. In addition, the connection between the two first magnetic members 140a, the connection between the two second magnetic members 140b and the connection between the first positioning hook 131a and the second positioning hook 131b are parallel to the sliding direction SD.

Referring to FIG. 2A and FIG. 2B, in the embodiment, the first body 11 is provided with a first magnetic guide rail 16a and a second magnetic guide rail 16b extending along the sliding direction SD in the second area 11b, and the positioning slots 15a are arranged between the first magnetic guide rail 16a and the second magnetic guide rail 16b along the sliding direction SD. In details, the two first magnetic members 140a overlap the first magnetic guide rail 16a and are magnetically attracted to the first magnetic guide rail 16a to generate magnetic attraction for positioning the touch pad module 100 during sliding or after being stationary. Besides, the two second magnetic members 140b overlap the second magnetic guide rail 16b and are magnetically attracted to the second magnetic guide rail 16b to generate magnetic attraction for positioning the touch pad module 100 during sliding or after being stationary.

In other embodiments, the first magnetic guide rail 16a and the second magnetic guide rail 16b can be configured in an optional manner. Taking the configuration of the first magnetic guide rail 16a as an example, the carrier 130 may be provided with at least one first magnetic member 140a. Taking the configuration of the second magnetic guide rail 16b as an example, the carrier 130 may be provided with at least one second magnetic member 140b.

Figure 4:
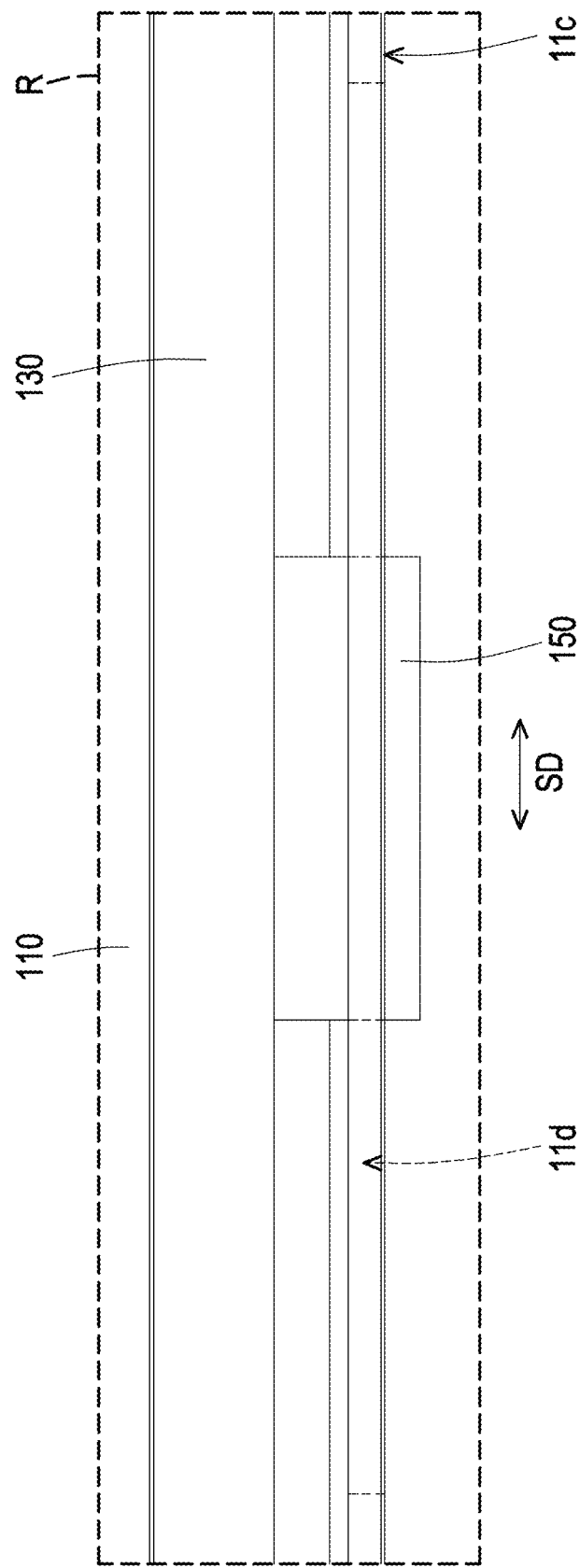
FIG. 4 is a partial enlarged schematic diagram of the region R of FIG. 2A.

FIG. 4 is a partial enlarged schematic diagram of the region R of FIG. 2A. Referring to FIG. 2A, FIG. 2B and FIG. 4, in the embodiment, the touch pad module 100 further includes a toggle member 150 connected to the carrier 130, and a side 11c of the first body 11 have a slot 11d extending along the sliding direction SD. In details, the toggle member 150 passes through the slot 11d and protrudes from the side 11c, and the user can push and pull the toggle member 150 to move the position of the touch pad module 100 in the second area 11b. That is to say, the user can manually adjust the position of the touch pad module 100 in the second area 11b in real time according to the operation requirements.

In other embodiments, the user can first remove the light-transmitting cover 14, and then manually adjust the position of the touch pad module 100 in the second area 11b.

In summary, in the electronic device of the present invention, the touch pad module is floating on the first body and is suitable for sliding back and forth along the predetermined sliding direction, so that the user can manually adjust the position of the touch panel module in real time to meet different operating needs. For users, the electronic device of the present invention has excellent operational flexibility.

Although the present invention has been disclosed above by the embodiments, it is not intended to limit the present invention, and any person with ordinary knowledge in the technical field is not intended to limit the present invention. Slight changes and modifications may be made without departing from the spirit and scope of the present invention, so the protection scope of the present invention should be determined by the following claims.

What is claimed is:

1. An electronic device, comprising:
a first body, has a first area and a second area arranged side by side;
a keyboard, disposed in the first area;
a touch pad module, slidably disposed in the second area, wherein the touch pad module comprises:
a touch panel; and
at least one light-emitting member, disposed around the touch panel;
a light-transmitting cover, disposed on the second area and covers the touch pad module; and
a second body, pivotally connected to the first body.

2. The electronic device according to claim 1, wherein the touch pad module further comprises a carrier, and the touch panel and the at least one light-emitting member is disposed on the carrier, the carrier is adapted to slide in the second area along a sliding direction, and comprises at least one positioning hook, wherein the first body is provided with multiple positioning slots arranged along the sliding direction in the second area, and the at least one positioning hook is engaged with any one of the positioning slots.

3. The electronic device according to claim 2, wherein the touch pad module further comprises at least one magnetic member disposed on the carrier, and the first body is provided with at least one magnetic guide rail extending along the sliding direction in the second area, the at least one magnetic member overlaps the at least one magnetic guide rail and is magnetically attracted to the at least one magnetic guide rail.

4. The electronic device according to claim 3, wherein the number of the at least one magnetic guide rail is two, and the positioning slots are arranged along the sliding direction between the two magnetic guide rails, the number of the at least one magnetic member is four, and the four magnetic members are respectively located at four corners of the carrier, two of the four magnetic members overlap and are magnetically attracted to one of the two magnetic guide rails, and the other two of the four magnetic members overlap and are magnetically attracted to the other of the two magnetic guide rails.

5. The electronic device according to claim 2, wherein the carrier has a first side and a second side opposite to the first side, and the sliding direction is perpendicular to the first side and the second side, the number of the at least one positioning hook is two, and the two positioning hooks protrude from the first side and the second side respectively.

6. The electronic device according to claim 2, wherein the at least one light-emitting member comprises a light source and a light guide optically coupled to the light source, and the light guide extends along at least one side of the carrier.

7. The electronic device according to claim 6, wherein the carrier has a first side and a second side opposite to the first side, and the sliding direction is perpendicular to the first side and the second side, the number of the at least one light-emitting member is two, and the two light guides of the two light-emitting members extend along the first side and the second side respectively.

8. The electronic device according to claim 2, wherein the touch pad module further comprises a toggle member connected to the carrier, and a side of the first body have a slot extending along the sliding direction, the toggle member passes through the slot to protrude from the side.

9. The electronic device according to claim 1, wherein the number of the at least one light-emitting member is two, and the two light-emitting members are respectively arranged on opposite sides of the touch panel.

10. An electronic device, comprising:
a first body, has a first area and a second area arranged side by side;
a keyboard, disposed in the first area;
a light-emitting touch pad module, slidably disposed in the second area;
a light-transmitting cover, disposed on the second area and covers the light-emitting touch pad module, the light-emitting touch pad module displays a drifting touch area on the light-transmitting cover; and
a second body, pivotally connected to the first body.

* * * * *